United States Patent
Zhou

(10) Patent No.: US 10,248,632 B2
(45) Date of Patent: *Apr. 2, 2019

(54) OPTIMIZATION FOR RENDERING WEB PAGES

(71) Applicant: International Business Machines Corporation, Armonk, NY (US)

(72) Inventor: Xiang Zhou, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 185 days.

This patent is subject to a terminal disclaimer.

(21) Appl. No.: 15/176,440

(22) Filed: Jun. 8, 2016

(65) Prior Publication Data

US 2016/0364370 A1 Dec. 15, 2016

Related U.S. Application Data

(63) Continuation of application No. 14/734,042, filed on Jun. 9, 2015.

(51) Int. Cl.
    *G06F 17/00* (2006.01)
    *G06F 17/22* (2006.01)
    *G06F 17/21* (2006.01)
    *G06F 17/24* (2006.01)
    *G06F 17/30* (2006.01)

(52) U.S. Cl.
    CPC ........ *G06F 17/2247* (2013.01); *G06F 17/211* (2013.01); *G06F 17/227* (2013.01); *G06F 17/2241* (2013.01); *G06F 17/248* (2013.01); *G06F 17/30899* (2013.01); *G06F 17/30905* (2013.01)

(58) Field of Classification Search
    CPC .................................. G06F 17/30905
    USPC ....................... 715/234, 236, 200
    See application file for complete search history.

(56) References Cited

U.S. PATENT DOCUMENTS 8,799,759 B2  8/2014  Falkenberg et al.
8,806,325 B2  8/2014  Decker et al.
(Continued)

FOREIGN PATENT DOCUMENTS

CN  102346770 B  5/2014

OTHER PUBLICATIONS

Howe, Shay, "Detailed Positioning—Learn to Code Advanced HTML & CSS", Internet Archieve Wayback Machine, Mar. 19, 2015, 19 pages, <learn.shayhowe.com>.
(Continued)

*Primary Examiner* — Manglesh M Patel
(74) *Attorney, Agent, or Firm* — Aaron N. Pontikos

(57) ABSTRACT

In one embodiment, there is provided a method for rendering a web page. The method comprises parsing a Hypertext Markup Language (HTML) document for a web page to generate a Document Object Model (DOM) tree. The method further comprises rendering elements in the DOM tree in a higher-to-lower sequence based on their z-index attributes from a style sheet corresponding to the HTML document. The method further comprises skipping rendering for an element with a lower z-index attribute than an element with a higher z-index attribute if the element with the lower z-index attribute is below the element with the higher z-index attribute and would not be seen by a user viewing the web page.

18 Claims, 4 Drawing Sheets

(56) References Cited

U.S. PATENT DOCUMENTS

| | | | |
|---|---|---|---|
| 8,892,543 | B1 | 11/2014 | Kapoor et al. |
| 2005/0022116 | A1 | 1/2005 | Bowman et al. |
| 2011/0258532 | A1* | 10/2011 | Ceze .................. G06F 17/30902 715/234 |
| 2012/0036264 | A1 | 2/2012 | Jiang et al. |
| 2013/0145255 | A1 | 6/2013 | Zheng et al. |
| 2014/0122225 | A1 | 5/2014 | Vasthimal et al. |
| 2014/0136952 | A1 | 5/2014 | Zhu et al. |
| 2015/0007278 | A1 | 1/2015 | Benezra |
| 2015/0205884 | A1 | 7/2015 | Leventhal |
| 2015/0381699 | A1 | 12/2015 | Eastham et al. |
| 2016/0364369 | A1 | 12/2016 | Zhou |

OTHER PUBLICATIONS

Rohler, Nathan, "The Z-index Property: How to Control Stacking in Your Webpages", Z-index Theory, Internet Archieve Wayback Machine, Mar. 26, 2015, 4 pages, <dwuser.com>.

"Overlapping and ZIndex", Wiki, Internet Archieve Wayback Machine, Apr. 29, 2015, 4 pages, <css-discuss.incutio.com/wiki>.

IBM Appendix P, "List of IBM Patents or Patent Applications Treated as Related", Dated Oct. 5, 2017, 2 pages.

Zhou, Xiang, "Optimization for Rendering Web Pages", U.S. Appl. No. 15/725,589, filed Oct. 5, 2017, pp. 1-28.

Lazaris, Louis, "The Z-Index CSS Property: A Comprehensive Look", Smashing Magazine, Sep. 15, 2009, 23 pages, <https://www.smashingmagazine.com/2009/09/the-z-index-css-property-a-comprehensive-look/>.

Walton, Philip, "What No One Told You About Z-Index", Jan. 15, 2013, 7 pages, <https://philipwalton.com/articles/what-no-one-told-you-about-z-index/>.

IBM, "List of IBM Patents or Patent Applications Treated as Related", Appendix P, 2 pages, dated Jun. 8, 2016.

Fink et al., "Introducing Single Page Applications", Chapter 1, Pro Single Page Application Development, May 7, 2014, © 2014 Apress, pp. 3-13, <http://link.springer.com/chapter/10.1007/978-1-4302-6674-7_1>.

Tesarik et al., "User interface design in practices in simple single page web applications", First International Conference on the Applications of Digital Information and Web Technologies, Aug. 4-6, 2008, ICADIWT 2008, © 2008 IEEE, pp. 223-228, DOI: 10.1109/ICADIWT.2008.4664349.

Zhou, Xiang, "Optimization for Rendering Web Pages", U.S. Appl. No. 14/734,042, filed Jun. 9, 2015, 31 pages.

* cited by examiner

OPTIMIZATION FOR RENDERING WEB PAGES

BACKGROUND

The present invention relates to web page rendering, and more specifically, to optimization for rendering web pages.

Nowadays, Web 2.0 is becoming more popular, and browsers are facing more difficulties in rendering entire web pages, especially complex Web 2.0 application pages. Current rendering mechanisms of web browsers typically are not well suited for Web 2.0 single page applications (SPA), which typically include lots of Hypertext Markup Language (HTML), Cascading Style Sheets (CSS) and JavaScript together.

Traditional web applications can cause disruption in user experience and workflow. For example, traditional web applications work by reloading the entire web page. In order to advance through a workflow, the user interacts with page elements (such as hyperlinks and form submit buttons) that cause the browser to issue a request to the server for a completely new page. Continual page redraws disrupt the user experience because the network latencies cannot be hidden from the user. There is typically a perceivable transitional jolt from one page to the next. Data of the next page is retrieved from the server, the old page is unloaded, and the new page is rendered to screen. The complete page reload that occurs on each user interaction results in unnecessary re-transmission of data over the network. This can make the overall performance of the website slower.

A single page application (SPA), also known as single page interface (SPI), is a web application that fits on a single web page with the goal of providing a more fluid user experience akin to a desktop application. SPAs address the above issues by requiring no page reload by the browser during an application session. All user interaction and changes of the application state are handled in the context of a single Web document. The user experience becomes more continuous and fluid, and network latencies can be hidden more easily.

In a SPA, either all necessary code (HTML, JavaScript, and CSS) is retrieved with a single page load, or partial changes are performed which load new code on demand from the web server, usually driven by user actions. The page is not automatically reloaded during user interaction with the application, and control is not transferred to another page. Updates to the displayed page may or may not involve interaction with a server. Thus, compared to normal Web applications that still use URL to switch between various functions and pages, the single page application achieves transferring of Web application programs from server side to client side, i.e., to browsers. This mechanism brings an additional advantages of cost reduction in servers, in addition to improvements in interactivity and response speed that can be perceived by users, and lower bandwidth occupancy between servers and clients.

However, since for SPA the Web application is transferred to client side, i.e., to a browser, the performance of the browser becomes important. For example, time cost on the first time rendering for a SPA web page is large, and frequent reflow and repaint via user behavior with respect to the SPA web page will bring bad performance.

Currently, there are several commonly used ways to improve the performance of a browser, one of which is to perform a reflow only when some reflow condition is matched, instead of performing the reflow unconditionally.

SUMMARY

Considering the above problems, embodiments of the present invention provide methods and systems for rendering a web page in a browser with improved performance.

According to an embodiment of the present invention, a method for rendering a web page is provided, comprising: parsing a Hypertext Markup Language (HTML) document for a web page to generate a Document Object Model (DOM) tree; rendering elements in the DOM tree in a higher-to-lower sequence based on their z-index attributes from a style sheet corresponding to the HTML document; and skipping rendering for an element with a lower z-index attribute than an element with a higher z-index attribute if the element with the lower z-index attribute is below the element with the higher z-index attribute and would not be seen by a user viewing the web page.

According to another embodiment of the present invention, a system for rendering a web page is provided, comprising: one or more computer processors; one or more computer readable storage media; and program instructions stored on the one or more computer readable storage media for execution by at least one of the one or more processors to perform actions of: parsing a Hypertext Markup Language (HTML) document for a web page to generate a Document Object Model (DOM) tree; rendering elements in the DOM tree in a higher-to-lower sequence based on their z-index attributes from a style sheet corresponding to the HTML document; and skipping rendering for an element with a lower z-index attribute than an element with a higher z-index attribute if the element with the lower z-index attribute is below the element with the higher z-index attribute and would not be seen by a user viewing the web page.

According to another embodiment of the present invention, a computer program product for rendering a web page is provided, the computer program product comprising one or more computer readable storage media and program instructions stored on the one or more computer readable storage media, the program instructions being executable by one or more computer processors to perform actions of: parsing a Hypertext Markup Language (HTML) document for a web page to generate a Document Object Model (DOM) tree; rendering elements in the DOM tree in a higher-to-lower sequence based on their z-index attributes from a style sheet corresponding to the HTML document; and skipping rendering for an element with a lower z-index attribute than an element with a higher z-index attribute if the element with the lower z-index attribute is below the element with the higher z-index attribute and would not be seen by a user viewing the web page.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
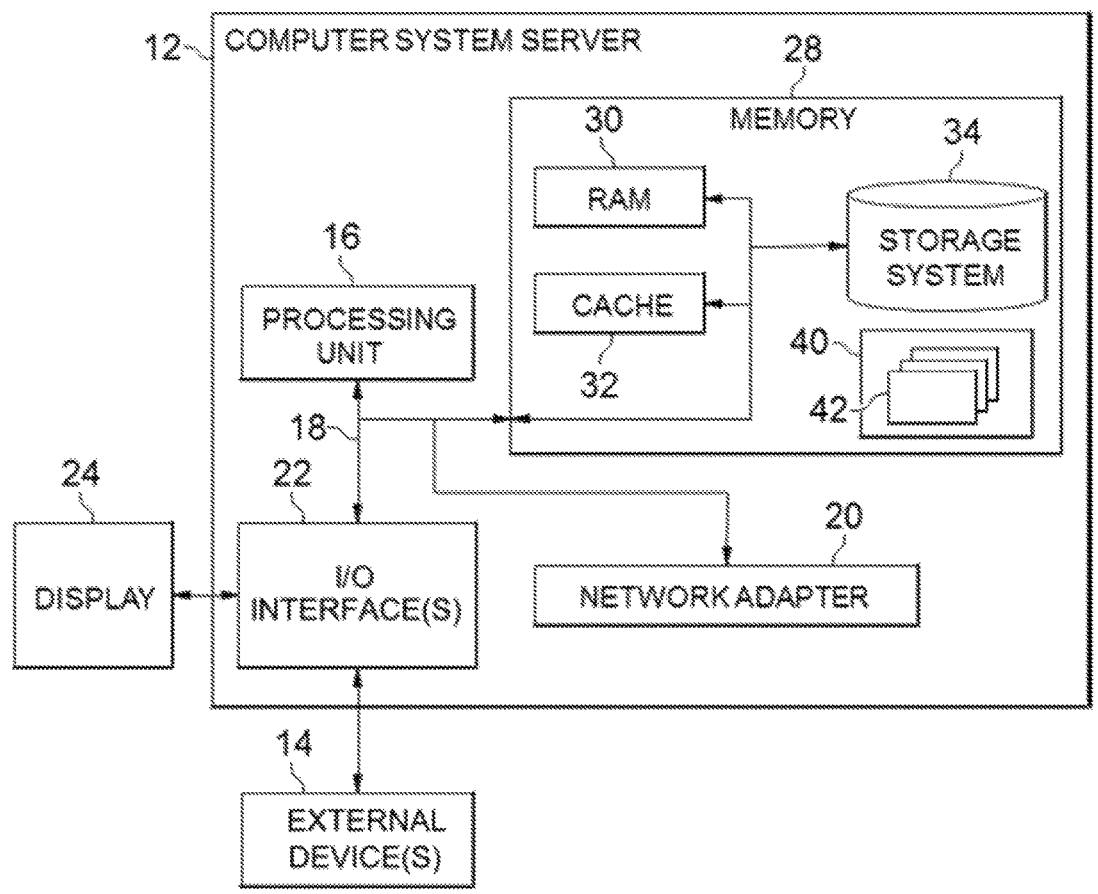
FIG. 1 shows an exemplary computer system which is applicable to implement embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In prior art systems, after inputting a URL of a web page, a browser located at a client device typically receives an HTML document and a style sheet from a server addressed by the URL, wherein the HTML document includes elements in the web pages, and the style sheet includes attributes specifying the styles of each of the elements. An HTML parser of the browser is used to parse the received HTML document into a Document Object Model (DOM) tree. All of the elements in the HTML are created in the DOM tree as nodes. DOM actually is a document model described in an object oriented manner. DOM defines objects necessary for representing and modifying a document, behaviors and attributes of these objects, and relationship between these objects. DOM can be deemed as a tree representation of data and structures on a page. After obtaining the DOM tree or at the same time, a CSS parser of the browser is used to parse the received style sheet into style rules, which defines attributes specifying the styles of each of the elements.

The parsed DOM tree and the parsed style rules can then be used by the browser to render the web page. Specifically, the process of rendering includes layout computing (also known as reflow) and painting (also known as repaint) of the elements. Each of the elements in the DOM structure has its own box (model), which needs to be computed by the browser according to various styles of browsers or defined by a developer, and elements will be put in place according to the result of the computation. This process is called "reflow". In other words, reflow refers to a process of calculating position and geometry of an element in a document by a browser for rendering part or the whole of the document. After positions, sizes and other attributes such as color, font, etc. of various boxes are determined, the browser paints these elements according to their respective styles so that content of the web page is presented. This process is called "repaint".

Reflow and repaint must happen while loading a web page. In addition, after the loading of the web page, some operations of a user or some operations of a script may also cause a reflow and/or a repaint in a browser. For example, resizing the window of a browser, using some Java Script methods (including computing styles, changing class of an element, or adding or deleting an element in a DOM tree) will cause a reflow; changing color of an element and changing font of an element will cause a repaint only. Sometimes, even if reflow is needed for only one element, it might require reflow for its parent element, grandparent element, and any child elements.

In the prior art, during the rendering, the layout computing is performed to all elements in the HTML document, and thereafter elements are painted one by one according to their styles.

An aspect of the invention provides a new method for a browser to do the rendering phase for a complex single page application, and describes a different approach in handling rendering workflow of a browser. This approach can help to build a more powerful browser rendering engine with better performance.

Figure 2:
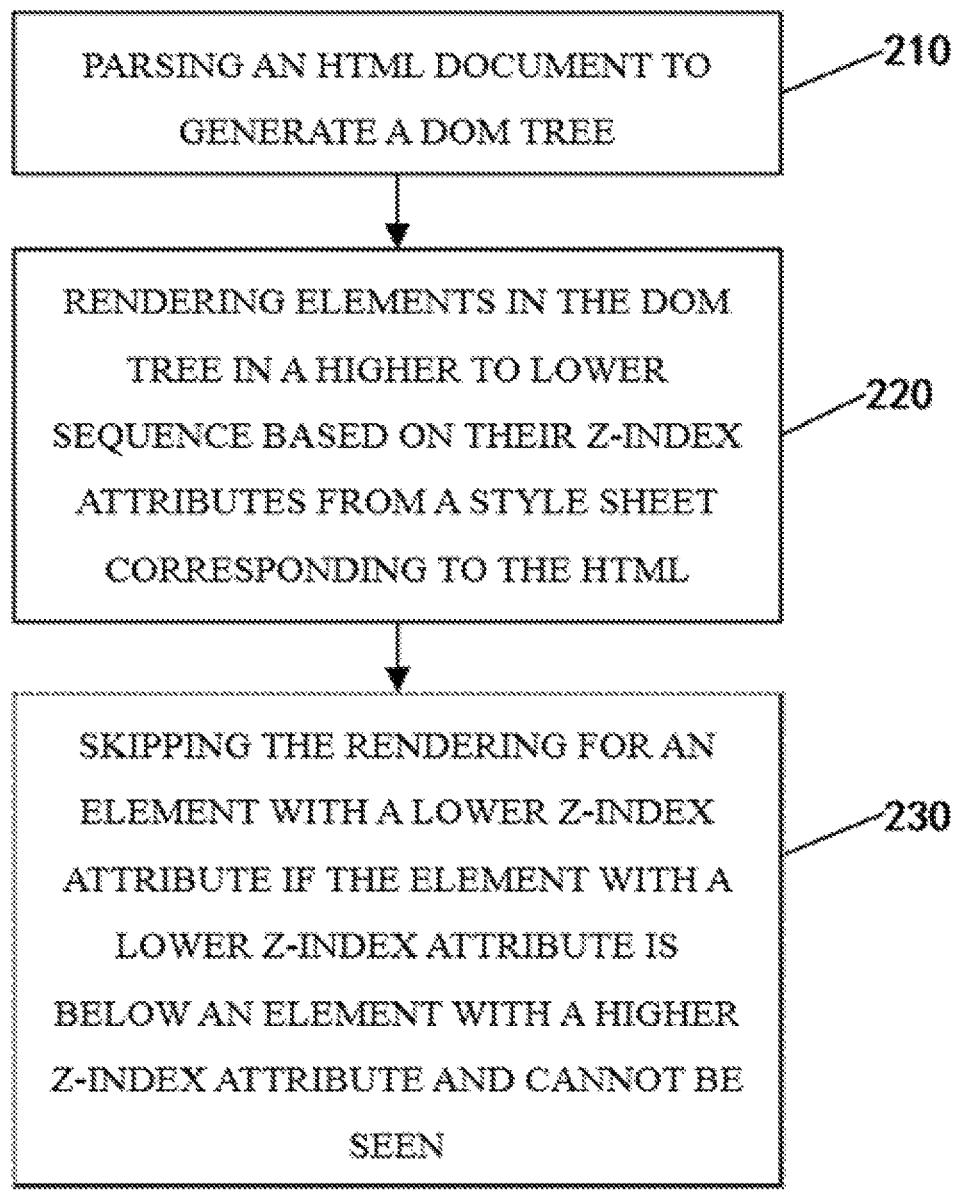
FIG. 2 shows a flowchart illustrating a method for rendering a web page according to an embodiment of the present invention.

FIG. 2 shows a flowchart illustrating a method 200 for rendering a web page according to an embodiment of the present invention. As shown in FIG. 2, the method 200 includes a parsing step 210, a rendering step 220 and a skipping step 230. Hereinafter, respective steps of the method 200 will be explained in detail.

In the parsing step 210, an HTML document is parsed to generate a DOM tree. In one embodiment of the invention, the parsing is performed by an HTML parser of a browser, and the HTML document is received from a server in response to an access request for a web page by the browser. After the parsing, all elements in the HTML documents are formed in the DOM tree as nodes, and all of the elements will be rendered.

In a modification of the parsing step 210 according to another aspect the invention, the parsing includes parsing with reference to a set of attributes from the style sheet corresponding to the HTML document so that the DOM tree is generated with hidden elements being separated from other elements. As described above, the style sheet includes attributes specifying the styles of each of the elements in the web page. Here, hidden elements refers to elements outside of the viewport of the browser, or elements inside the viewport of the browser but having an attribute "display" with a value of "none" or an attribute "visibility" with a value of "hidden". In a further embodiment of the invention, an element having attribute "opacity" with a value of "0" can also be deemed as a hidden element since this element is completely transparent. For those hidden elements, since they cannot be seen and cannot influence the layout or the appearance of the web page, effort taken for rendering them in loading the web page at the first time is wasteful, and, thus, hidden elements can be filtered out before rendering to improve the performance of rendering.

To filter hidden elements out, the HTML parser refers to the style rules. Here, a specific example is given to explain how to use style rules to filter hidden elements out. The following is an example of a CSS source file:

```
body .edit {
  background-image: url('/demandtec/images/dojo/edit.gif');
  width: 25px;
  height: 16px;
  z-index: 50;
  position: absolute; left: 50px; top: 50px;
}
#container .dijitMenuItemSelected .innerContainer > .editButton {
  display: none;
  border: 1px solid red;
```

```
}
.deleteButton {
  opacity: 0.9;
  z-index: 100;
  padding: 5px;
}
```

In this example CSS source file, styles of three elements (i.e., (body .edit), (#container.dijitMenuItemSelected.innerContainer>.editButton), and (.deleteButton)) are defined. Typically, the CSS source file is processed by a CSS parser of the browser to create a map consists of pairs of keys and values. Specifically, each key corresponds to an element, and the value corresponds to all attributes of the element. For example, a pair in the map could be: .deleteButton->opacity: 0.9; z-index: 100; padding: 5px. This map will help the browser to render a web page based on elements in the web page.

However, in the modification of the parsing step 210, in addition to the above map, a new map is created for use in the parsing in the HTML parser. The new map also consists of pairs of keys and values; however, in the new map, each key corresponds to one of a set of attributes, and the value corresponds to elements having the attribute. The set of attributes include at least one of visibility, display, attributes related to position, attributes related to transform, attributes related to perspective, and opacity. For example, attributes such as position, left, top right, bottom, width, height, etc. belong to attributes related to position. Attributes related to transform and attributes related to perspective are defined by CSS3. The attributes in the set used as keys in the new map are not limited by the above examples. Any attribute that can be used to identify if an element is actually visible to a viewer can be used as a key in the new map, which includes attributes that may emerge in further versions of CSS. The z-index attribute indicates a depth of an element in the meaning of graphics. The higher the z-index of an element is, the closer the element is to the viewer in the depth direction. However, those skilled in the art know that the z-index does not represent a real depth, and it only represents an overlaying relationship between elements. The z-index is different from the above set of attributes since z-index cannot be used to identify if an element is actually visible to a viewer. In one embodiment of the invention, z-index is used to organize elements other than the hidden elements.

For example, for the above CSS source file, a new map can be created as follows:

| Key | Value |
| --- | --- |
| position -> | (body .edit) |
| display -> | (#container .dijitMenuItemSelected .innerContainer > .editButton) |
| z-index -> | (body .edit) + (.deleteButton) |

With this new map, since keys in the new map are attributes, it will be helpful for the HTML parser to generate a DOM tree based on specific attributes. In one embodiment of the invention, the new map can be created directly from the CSS source file. In another embodiment of the invention, the new map can be created from the style rules, i.e., the result obtained by the CSS parser parsing the CSS source file.

Figure 3:
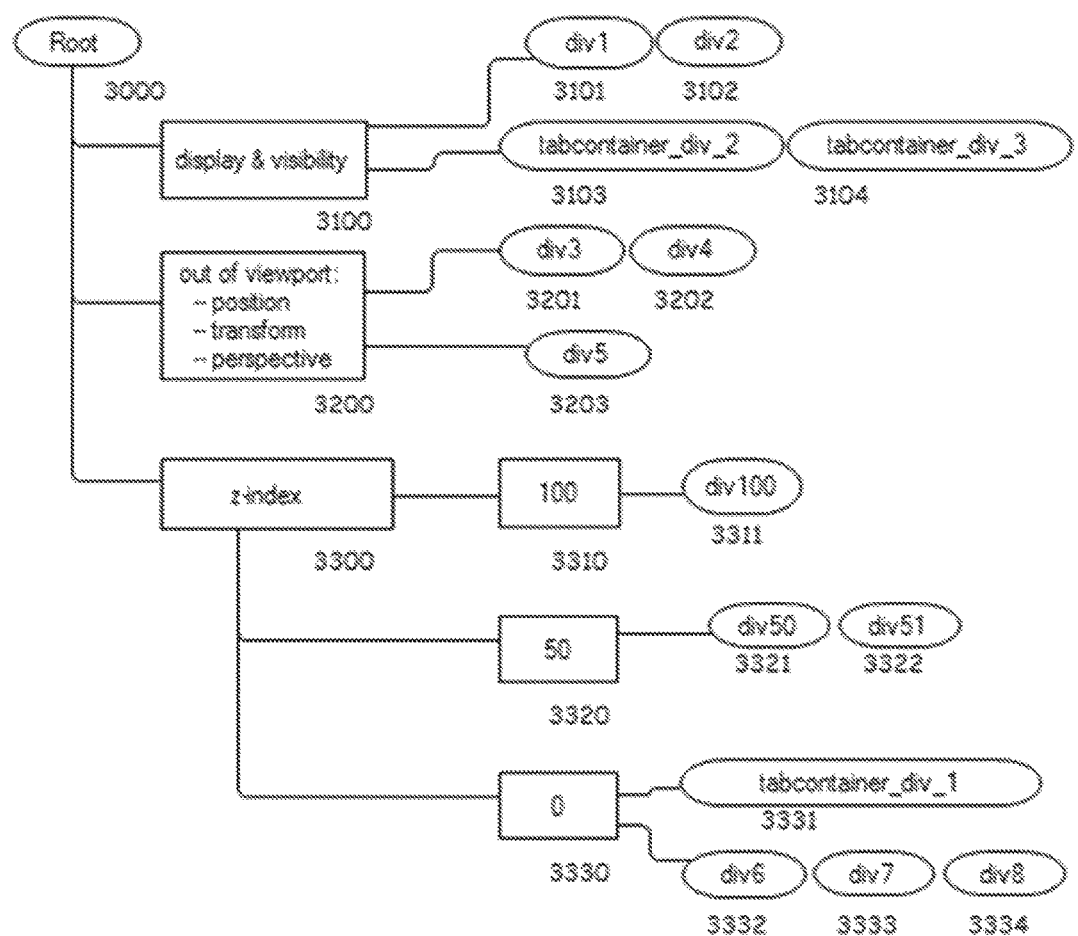
FIG. 3 shows an example of a DOM tree generated according to an embodiment of the present invention.
Figure 4:
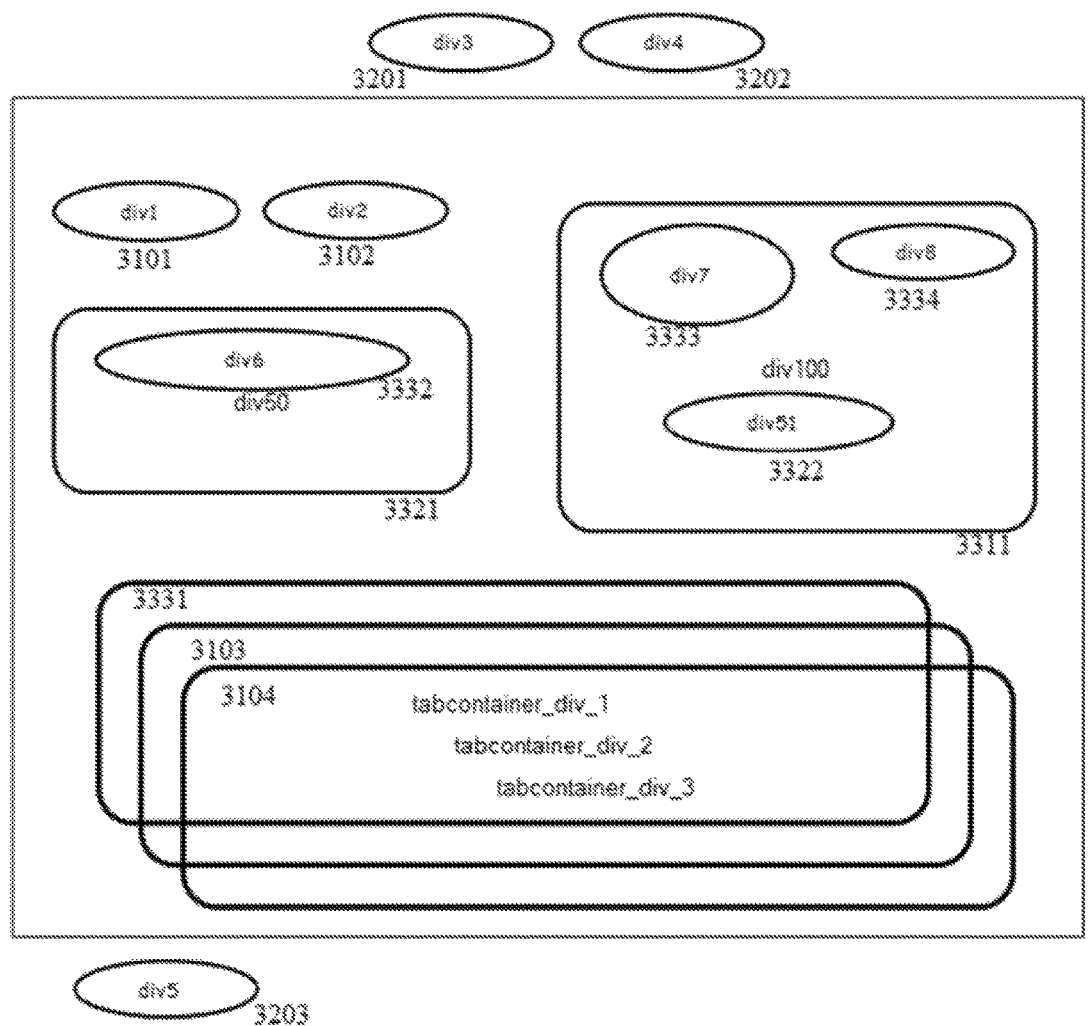
FIG. 4 shows an example layout on a browser of elements in the generated DOM tree of FIG. 3, in accordance with an embodiment of the present invention.

In the modification of the parsing step 210, the parsing includes parsing with reference to a set of attributes from the style sheet corresponding to the HTML document, so that the DOM tree is generated with hidden elements being separated from other elements. FIG. 3 shows an example of a DOM tree generated according to an embodiment of the invention, which is used to explain how to separate hidden elements from other elements in generating the DOM tree. FIG. 4 shows an example layout on the browser of elements in the generated DOM tree of FIG. 3.

In FIG. 3, a DOM tree generated by the HTML parser according to an embodiment of the invention is illustrated, in which an oval represents a node of the DOM tree (3000, 3101-3104, 3201-3203, 3311, 3321-3322, 3331-3334), and a box represents a condition used to determine which element(s) should be put in the branch corresponding to the box (3100, 3200, 3300, 3310, 3320, 3330). For example, elements having an attribute satisfying "display: none" or "visibility: hidden" will be placed in the "display & visibility" branch of the DOM tree. If an element has an attribute of "display: none", the element will not be displayed. If an element has an attribute of "visibility: hidden", the element will be hidden. Thus, it will save effort and improve performance if these elements are filtered out before rendering. In FIG. 3, for example, elements div1 and div2 have an attribute of "display: none", and elements tabcontainer_div_2 and tabcontainer_div_3 have an attribute of "visibility: hidden", thus they are placed in the "display & visibility" branch. FIG. 4 shows the position of elements div1 and div2, and elements div1 and div2 will not be displayed. In FIG. 4, elements tabcontainer_div1, tabcontainer_div_2 and tabcontainer_div_3 form a three-tab control on the web page. After rendering, the tab of tabcontainer_div_1 is shown by default, and the other two tabs are hidden and cannot be seen.

Additionally, for example, elements that have been determined to be outside of the viewport of the browser are placed in the "out of viewport" branch of the DOM tree. For example, the determination can be based on attributes related to position, attributes related to transform, attributes related to perspective, etc. of an element. If an element is determined to be outside of the viewport of the browser based on its attributes, filtering out that element before rendering will save effort and improve performance. In FIG. 3, for example, element div3, div4 and div5 are determined to be outside of the viewport of the browser based on their attributes, so they are place in the "out of viewport" branch of the DOM tree. FIG. 4 shows the position of elements div3, div4 and div5 (i.e., outside of viewport), and elements div3, div4 and div5 will not be seen.

In the example of FIG. 3, elements in the "out of viewport" branch and the "display & visibility" branch of the DOM tree belong to hidden elements. Elements other than the hidden elements are organized in another branch. Thus, the hidden elements and elements other than the hidden elements are separated from each other in the DOM tree. In one embodiment of the invention, elements with different z-index attributes are located in different parts of the DOM tree. That is, besides being placed together, for example in the same branch, elements other than hidden elements are further organized based on their z-index attribute. In the example of FIG. 3, elements other than hidden elements are all placed in the "z-index" branch and further organized based on z-index attribute of the elements. For example, element div100 is placed in the "100" branch since it has an attribute of "z-index: 100"; elements div50 and div51 are placed in the "50" branch since they have an attribute of "z-index: 50"; and elements tabcontainer_div_1, div6, div7 and div8 are placed in the "0" branch since they have an attribute of "z-index: 0" or do not define the z-index attribute.

FIG. 3 only shows an exemplary structure of a DOM tree. The invention is not limited by the example in FIG. 3. For example, hidden elements can be organized in only one branch, or hidden elements can be organized in three or more branches, such as "display" branch, "visibility" branch, "out of viewport: position" branch, "out of viewport: transform" branch, "out of viewport: perspective" branch, etc. The hidden elements can be organized in any manner in which they are separated from non-hidden elements. In another embodiment of the invention, elements are just placed together in the DOM tree but not organized based on z-index attributes, in which case the HTML parser will search through the non-hidden elements for an element with the highest z-index, then an element with the second highest z-index, etc.

Now returning to FIG. 2, in the rendering step 220, elements in the DOM tree are rendered in a higher-to-lower sequence based on their z-index attributes from a style sheet corresponding to the HTML document. In one embodiment of the parsing step 210, elements are not treated differently, so all elements will be rendered in the rendering step 220 in a higher-to-lower sequence based on their z-index attributes. That is, the element with the highest z-index will be rendered first, and the element with the lowest z-index will be rendered last.

However, if the modification of the parsing step 210 is adopted, only elements other than hidden element (elements after filtering) will be rendered. That is, in the rendering step 220, the rendering includes only rendering elements other than the hidden element. Taking the DOM tree in FIG. 3 as an example, element div100 will be rendered first since it has the highest z-index of "100"; then elements div50 and div51 are to be rendered since they have the second highest z-index of "50"; and then elements tabcontainer_div_1, div6, div7 and div8 are to be rendered last since they have the lowest z-index of "0".

In the skipping step 230, the rendering for an element with a lower z-index attribute is skipped if the element with a lower z-index attribute is below an element with a higher z-index attribute and cannot be seen (i.e., would not be seen by a user viewing the rendered web page). During the rendering step, elements in the DOM tree are considered from upper level to lower level. After rendering an upper element, it needs to be determined if a lower element is completely covered by the upper element based on their position related attributes. If an element cannot be seen, then that element is completely covered by an upper nontransparent element. This process will be explained with reference to the examples in FIG. 3 and FIG. 4. For example, in FIG. 4, element div100 with z-index of "100" is rendered first.

After that, elements div50 and div51 with z-index of "50" are to be rendered. Since element div50 is not below any upper elements, it will be rendered. However, for element div51, it is determined that element div51 is below the upper element div100 based on their position related attributes. Here, if element div51 is overlapped with element div100, but not completely covered by element div100, then element div51 still can be seen, and, thus, element div51 will be rendered. However, if element div51 is completely covered by element div100, as shown in FIG. 4, the opacity attribute of the upper element (i.e., div100) should be considered. If the opacity attribute of element div100 is less than 1, which means it is transparent to some extent, then element div51 still can be seen, and, thus, element div51 will be rendered. Otherwise, if the opacity attribute of element div100 is equal to 1, which means it is not transparent completely, then rendering for element div51 can be skipped.

After that, elements tabcontainer_div_1, div6, div7 and div8 with z-index of "0" are to be rendered. Since element tabcontainer_div_1 is not below any upper elements, it will be rendered. However, for elements div6, div7 and div8, it is determined that element div6 is below the upper element div50, and elements div7 and div8 are below the upper element div100, based on their position related attributes. Thus, for elements div6, div7 and div8, a determination needs to be made similar to the above determination on element div51.

Here, in FIG. 4, it is assumed that the opacity attribute of element div100 has a value of "1" and the opacity attribute of element div50 has a value of "0.5". In this case, element div6 can be seen and, thus, is rendered; and elements div51, div7 and div8 are covered completely by element div100 that are not transparent, thus the rendering for elements div51, div7 and div8 is skipped. The skipping will save effort for rendering unnecessary elements and improve the rendering performance of the browser.

As described above, after the loading of the web page, some operations of a user or some operations of a script will also cause a reflow and/or a repaint in a browser. In one embodiment of the invention, the method 200 may further comprise: in response to a change of the DOM tree, rendering elements in the changed DOM tree in a higher-to-lower sequence based on their z-index attributes; and skipping the rendering for an element in the changed DOM tree with a lower z-index attribute if the element with a lower z-index attribute is below an element with a higher z-index attribute and cannot be seen. That is, the processes in steps 220 and 230 of the method 200 will be performed in response to a change of the structure of the DOM tree.

As for the example in FIG. 3, if a user clicks the second tab (tabcontainer_div_2) on the web page, the attribute "visibility" of element tabcontainer_div_2 will become "visible" from "hidden", and accordingly the attribute "visibility" of element tabcontainer_div_1 will become "hidden" from "visible". Thus, the change of style will cause the change of DOM tree. In this case, in response to the user operation, positions of elements tabcontainer_div_1 and tabcontainer_div_2 in the DOM tree are swapped. Now, rendering for elements is performed based on the modified DOM tree in a higher-to-lower sequence based on their z-index attributes. The process of rendering and skipping is similar to that in the steps 220 and 230.

In another example, if a user operation or running of a script causes element div100 to be removed from the DOM tree, then the rendering is performed based on the modified DOM tree in a higher-to-lower sequence based on their z-index attributes. In this example, since the upper element div100 is removed, elements div7, div8 and div51 can now be seen, and, thus, will be determined to be rendered.

Reflow and repaint are associated with each other. Reflow involves layout computing (i.e., the updating of data). Repaint involves presentation (i.e., actual painting). In prior art systems, a reflow will typically cause a repaint. In some cases, user operations are frequent, which will cause a frequent reflow and repaint. Typically, the painting will cost much more time than layout computing.

In another embodiment of the invention, to further improve the performance of the browser, the method 200 may further comprise: performing layout computing once the layout of an element changes, during the running of a JavaScript thread initiated automatically or in response to a user operation on the web page; and painting all of the elements whose layouts have changed at once, based on the final result of the layout computing, in the JavaScript thread. That is, this embodiment splits the reflow (model) and repaint (presentation), thus a reflow will not necessarily cause a repaint. Specifically, a JavaScript thread will be initiated automatically or in response to a user operation on the web page. During the running of this JavaScript thread, layout computing (reflow) is performed once the layout of an element changes (i.e., the layout computing can be performed multiple times accumulatively). However, the painting of all of the elements whose layouts have changed will be performed only once during the running, or at the end, of this JavaScript thread. By doing so, the painting that consumes much time will not be performed too frequently, and, thus, the performance of the browser can be improved further.

In another embodiment of the invention, to further improve the performance of the browser, the method 200 may further comprise: caching data for rendering a part of elements in the DOM tree based on the analysis of user operations on the web page; and using cached data to perform layout computing and painting of the part of elements when they are to be rendered. This process will be explained with reference to FIG. 3 and FIG. 4. Firstly, the history of user operation can be analyzed to identify a frequent user operation. For example, if the user frequently clicked the third tab (tabcontainer_div_3) on the web page in FIG. 4, then data for rendering the third tab can be cached. The data for rendering may include result of layout computing, or any intermediate data structure that can accelerate the rendering. When an element whose data for rendering is cached is to be rendered, the cached data can be used to perform layout computing and painting of the element. Since cached data is used, it is not necessary to perform layout computing and painting for a frequently rendered element all the time, and the performance of the browser is further improved.

With the above embodiments of the invention, better performance for an SPA web page and better performance for reflow and repaint are achieved. In addition to browsers, embodiments of the present invention also apply to apps and other computer software that are based on Web 2.0.

The present invention may be a system, a method, and/or a computer program product. The computer program product may include a computer readable storage medium (or media) having computer readable program instructions thereon for causing a processor to carry out aspects of the present invention.

In an embodiment of the present invention, there is provided a computer program product for rendering a web page. The computer program product comprises a computer readable storage medium having program instructions embodied therewith. The program instructions are executable by a device to perform a method. The method comprises parsing an HTML document to generate a DOM tree. The method further comprises rendering elements in the DOM tree in a higher-to-lower sequence based on their z-index attributes corresponding to the HTML document. The method further comprises skipping the rendering for an element with a lower z-index attribute if the element with a lower z-index attribute is below an element with a higher z-index attribute and cannot be seen.

In one embodiment of the computer program product, wherein the parsing includes parsing with reference to a set of attributes from the style sheet corresponding to the HTML document so that the DOM tree is generated with hidden elements being separated from other elements; and wherein the rendering includes only rendering elements other than the hidden element.

In one embodiment of the computer program product, wherein the set of attributes include at least one of visibility, display, attributes related to position, attributes related to transform, attributes related to perspective, and opacity.

In one embodiment of the computer program product, wherein the rendering includes layout computing and painting of the elements, and wherein the method further comprising: performing layout computing once the layout of an element changes, during the running of a JavaScript thread initiated automatically or in response to a user operation on the web page; and painting all of the elements whose layouts have changed at once, based on the final result of the layout computing, in the JavaScript thread.

In one embodiment of the computer program product, wherein the method further comprising: in response to a change of the DOM tree or style of an element, rendering elements in the DOM tree in a higher-to-lower sequence based on their z-index attributes; and skipping the rendering for an element with a lower z-index attribute if the element with a lower z-index attribute is below an element with a higher z-index attribute and cannot be seen.

In one embodiment of the computer program product, wherein the method further comprising: caching data for rendering a part of elements in the DOM tree based on the analysis of user operations on the web page; and using cached data to perform layout computing and painting of the part of elements when they are to be rendered.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for rendering a web page, comprising:
   parsing a Hypertext Markup Language (HTML) document for a web page to generate a Document Object Model (DOM) tree;
   caching data for rendering a first portion of a plurality of elements in the DOM tree based on an analysis of user operations on the web page;
   rendering the plurality of elements in the DOM tree in a higher-to-lower sequence based on their z-index attributes from a style sheet corresponding to the HTML document, wherein rendering the plurality of elements includes using the cached data to perform layout computing and painting of the first portion of the plurality of elements; and
   skipping rendering for an element with a lower z-index attribute than an element with a higher z-index attribute if the element with the lower z-index attribute is below the element with the higher z-index attribute and would not be seen by a user viewing the web page.

2. The method according to claim 1, wherein the parsing includes parsing the HTML document with reference to a set of attributes from the style sheet corresponding to the HTML document so that the DOM tree is generated with hidden elements being separated from other elements; and
   wherein the rendering includes only rendering elements other than the hidden elements.

3. The method according to claim 2, wherein the set of attributes includes at least one of visibility, display, attributes related to position, attributes related to transform, attributes related to perspective, or opacity.

4. The method according to claim 1, wherein rendering the plurality of elements includes performing layout computing and painting of a second portion of elements of the plurality of elements in the DOM tree.

5. The method according to claim 4, further comprising:
   performing layout computing once a layout of an element in the second portion of elements changes, during running of a JavaScript thread initiated automatically or in response to a user operation on the web page; and
   painting all elements whose layouts have changed at once, based on a final result of the layout computing, in the JavaScript thread.

6. The method according to claim 1, further comprising:
   in response to a change of the DOM tree, rendering elements in the changed DOM tree in a higher-to-lower sequence based on their respective z-index attributes; and
   skipping rendering for an element in the changed DOM tree with a lower z-index attribute than an element with a higher z-index attribute if the element with the lower z-index attribute is below the element with the higher z-index attribute and would not be seen by a user viewing the web page.

7. A computer program product, the computer program product comprising one or more computer readable storage media and program instructions stored on said one or more computer readable storage media, said program instructions comprising instructions to:
   parse a Hypertext Markup Language (HTML) document for a web page to generate a Document Object Model (DOM) tree;
   cache data for rendering a first portion of a plurality of elements in the DOM tree based on an analysis of user operations on the web page;
   render the plurality of elements in the DOM tree in a higher-to-lower sequence based on their z-index attributes from a style sheet corresponding to the HTML document, wherein rendering the plurality of elements includes using the cached data to perform layout computing and painting of the first portion of the plurality of elements; and
   skip rendering for an element with a lower z-index attribute than an element with a higher z-index attribute if the element with the lower z-index attribute is below the element with the higher z-index attribute and would not be seen by a user viewing the web page.

8. The computer program product according to claim 7, wherein the instructions to parse include instructions to parse the HTML document with reference to a set of attributes from the style sheet corresponding to the HTML document so that the DOM tree is generated with hidden elements being separated from other elements; and
   wherein the instructions to render includes only rendering elements other than the hidden elements.

9. The computer program product according to claim 8, wherein the set of attributes includes at least one of visibility, display, attributes related to position, attributes related to transform, attributes related to perspective, or opacity.

10. The computer program product according to claim 7, wherein the instructions to render the plurality of elements includes instructions to perform layout computing and painting of a second portion of elements of the plurality of elements in the DOM tree.

11. The computer program product according to claim 10, further comprising instructions to:
   perform layout computing once a layout of an element in the second portion of elements changes, during running of a JavaScript thread initiated automatically or in response to a user operation on the web page; and paint all elements whose layouts have changed at once, based on a final result of the layout computing, in the JavaScript thread.

12. The computer program product according to claim 7, further comprising instructions to:
in response to a change of the DOM tree, render elements in the changed DOM tree in a higher-to-lower sequence based on their respective z-index attributes; and
skip rendering for an element in the changed DOM tree with a lower z-index attribute than an element with a higher z-index attribute if the element with the lower z-index attribute is below the element with the higher z-index attribute and would not be seen by a user viewing the web page.

13. A computer system, the computer system comprising:
one or more computer processors;
one or more computer readable storage media;
computer program instructions;
said computer program instructions being stored on said one or more computer readable storage media;
said computer program instructions comprising instructions to:
parse a Hypertext Markup Language (HTML) document for a web page to generate a Document Object Model (DOM) tree;
cache data for rendering a first portion of a plurality of elements in the DOM tree based on an analysis of user operations on the web page;
render the plurality of elements in the DOM tree in a higher-to-lower sequence based on their z-index attributes from a style sheet corresponding to the HTML document, wherein rendering the plurality of elements includes using the cached data to perform layout computing and painting of the first portion of the plurality of elements; and
skip rendering for an element with a lower z-index attribute than an element with a higher z-index attribute if the element with the lower z-index attribute is below the element with the higher z-index attribute and would not be seen by a user viewing the web page.

14. The computer system according to claim 13, wherein the instructions to parse include instructions to parse the HTML document with reference to a set of attributes from the style sheet corresponding to the HTML document so that the DOM tree is generated with hidden elements being separated from other elements; and
wherein the instructions to render includes only rendering elements other than the hidden elements.

15. The computer system according to claim 14, wherein the set of attributes includes at least one of visibility, display, attributes related to position, attributes related to transform, attributes related to perspective, or opacity.

16. The computer system according to claim 13, wherein the instructions to render the plurality of elements includes instructions to perform layout computing and painting of a second portion of elements of the plurality of elements in the DOM tree.

17. The computer system according to claim 16, further comprising instructions to:
perform layout computing once a layout of an element in the second portion of elements changes, during running of a JavaScript thread initiated automatically or in response to a user operation on the web page; and
paint all elements whose layouts have changed at once, based on a final result of the layout computing, in the JavaScript thread.

18. The computer system according to claim 13, further comprising instructions to:
in response to a change of the DOM tree, render elements in the changed DOM tree in a higher-to-lower sequence based on their respective z-index attributes; and
skip rendering for an element in the changed DOM tree with a lower z-index attribute than an element with a higher z-index attribute if the element with the lower z-index attribute is below the element with the higher z-index attribute and would not be seen by a user viewing the web page.

* * * * *